(12) United States Patent
Yang et al.

(10) Patent No.: US 10,564,476 B2
(45) Date of Patent: Feb. 18, 2020

(54) LIQUID CRYSTAL DISPLAY PANEL

(71) Applicant: BOE TECHNOLOGY GROUP CO., LTD., Beijing (CN)

(72) Inventors: Yafeng Yang, Beijing (CN); Xin Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/501,942

(22) PCT Filed: Jul. 21, 2016

(86) PCT No.: PCT/CN2016/090831
§ 371 (c)(1),
(2) Date: Feb. 6, 2017

(87) PCT Pub. No.: WO2017/071317
PCT Pub. Date: May 4, 2017

(65) Prior Publication Data
US 2017/0269419 A1    Sep. 21, 2017

(30) Foreign Application Priority Data
Oct. 28, 2015 (CN) .......................... 2015 1 0716010

(51) Int. Cl.
*G02F 1/13363* (2006.01)
*G02F 1/1337* (2006.01)
*G02F 1/1335* (2006.01)

(52) U.S. Cl.
CPC ........ *G02F 1/13363* (2013.01); *G02F 1/1337* (2013.01); *G02F 1/133528* (2013.01);
(Continued)

(58) Field of Classification Search
CPC ............ G02F 1/13363; G02F 1/133528; G02F 1/1337; G02F 1/133711; G02F 1/134336;
(Continued)

(56) References Cited

U.S. PATENT DOCUMENTS

2006/0050216 A1* 3/2006 Joten ................. G02F 1/133528
349/117
2006/0055855 A1    3/2006 Duz et al.
(Continued)

FOREIGN PATENT DOCUMENTS

CN           2800327 Y      7/2006
CN           1949053 A      4/2007
(Continued)

OTHER PUBLICATIONS

International Search Report of PCT/CN2016/090831 in Chinese, dated Sep. 28, 2016 with English translation.
(Continued)

*Primary Examiner* — Angela K Davison
(74) *Attorney, Agent, or Firm* — Collard & Roe, P.C.

(57) ABSTRACT

A liquid crystal display panel is provided. The liquid crystal display panel comprises: a first substrate (110) and a second substrate (120) which are oppositely arranged, and a liquid crystal layer (130) arranged between the first substrate (110) and the second substrate (120); an alignment film (300) arranged on an inner side of the first substrate (110); and a compensation film (400) arranged on an inner side or an outer side of the second substrate (120). The inner side of the first substrate (110) and the inner side of the second substrate (120) are sides facing each other, and the outer side of the second substrate (120) is a side provided away from the inner side of the second substrate (120).

7 Claims, 2 Drawing Sheets

(52) U.S. Cl.
CPC ............ *G02F 2001/133531* (2013.01); *G02F 2001/133638* (2013.01); *G02F 2413/02* (2013.01); *G02F 2413/06* (2013.01)

(58) Field of Classification Search
CPC ....... G02F 1/1343; G02F 2001/133531; G02F 2001/133638; G02F 2001/133541; G02F 2001/134372; G02F 2413/02; G02F 2413/06
See application file for complete search history.

(56) References Cited

U.S. PATENT DOCUMENTS

| | | | |
|---|---|---|---|
| 2007/0085948 A1 | 4/2007 | Kim et al. | |
| 2012/0313918 A1* | 12/2012 | Qin | G02F 1/133555 345/211 |
| 2014/0240649 A1* | 8/2014 | Shen | G02F 1/1337 349/106 |
| 2015/0049284 A1* | 2/2015 | Jung | G02F 1/13363 349/96 |
| 2015/0085217 A1* | 3/2015 | Nanjo | G02B 5/3083 349/42 |

FOREIGN PATENT DOCUMENTS

| | | |
|---|---|---|
| CN | 102830546 A | 12/2012 |
| CN | 105182619 A | 12/2015 |
| CN | 205067927 U | 3/2016 |
| JP | 2013-137433 A | 7/2013 |
| TW | 200609571 A | 3/2006 |

OTHER PUBLICATIONS

Notice of Transmittal of the International Search Report of PCT/CN2016/090831 in Chinese, dated Sep. 28, 2016.

Nritten Opinion of the International Searching Authority of PCT/CN2016/090831 in Chinese, dated Sep. 28, 2016 with English translation.

Chinese Office Action in Chinese Application No. 201510716010.X, dated Sep. 7, 2017 with English translation.

* cited by examiner

LIQUID CRYSTAL DISPLAY PANEL

CROSS REFERENCE TO RELATED APPLICATIONS

This application is the National Stage of PCT/CN2016/090831 filed on Jul. 21, 2016, which claims priority under 35 U.S.C. § 119 of Chinese Application No. 201510716010.X filed on Oct. 28, 2015, the disclosure of which is incorporated by reference.

TECHNICAL FIELD

Embodiments of the present disclosure relate to a liquid crystal display panel.

BACKGROUND

Generally, a liquid crystal display panel is matched with a polarizer to carry out image display. The polarizer may be arranged inside or outside the liquid crystal display panel. Compared with a structure that the polarizer is arranged outside the liquid crystal display panel, a structure that the polarizer is arranged inside the liquid crystal display panel is thinner and is suitable for the development tendency of lighting and thinning of the liquid crystal display panel.

SUMMARY

According to embodiments of the disclosure, a liquid crystal display panel is provided. The liquid crystal display panel comprises: a first substrate and a second substrate which are oppositely arranged, and a liquid crystal layer arranged between the first substrate and the second substrate; an alignment film arranged on an inner side of the first substrate; and a compensation film arranged on an inner side or an outer side of the second substrate. The inner side of the first substrate and the inner side of the second substrate are sides facing each other, and the outer side of the second substrate is a side provided away from the inner side of the second substrate.

For example, a first polarizer is arranged between the first substrate and the alignment film; and in a case that the compensation film is arranged on the inner side of the second substrate, a second polarizer is arranged between the second substrate and the compensation film.

For example, the compensation film is a view angle compensation film.

For example, in the case that the liquid crystal display panel is a liquid crystal display panel in an advanced super dimension switch mode or and in-plane-switching mode, a phase retardation of the compensation film is that Re=$\lambda/2$, where $\lambda$, represents a main wavelength of light of a backlight of the liquid crystal display panel; and refractive indexes nx, ny and nz of the compensation film at an X axis, a Y axis and a Z axis meet the following formula:

$$(nx-nz)/(nx-ny)=0.5.$$

For example, in the case that the liquid crystal display panel is a liquid crystal display panel in a vertical alignment mode or a twisted nematic mode, two layers of compensation films are provided; the compensation film arranged on the inner side of the second polarizer is a first compensation film, a phase retardation of the first compensation film is that Re=$\lambda/2$, where $\lambda$, represents a main wavelength of a light of a backlight of the liquid crystal display panel, and the inner side of the second polarizer is one side of the second polarizer, which faces the liquid crystal layer; refractive indexes nx, ny and nz of the first compensation film at the X axis, the Y axis and the Z axis meet the following formula: (nx−nz)/(nx−ny)=0.5; and the compensation film arranged on the inner side of the first compensation film is a second compensation film, the second compensation film and the liquid crystal layer are equal in absolute value of retardation amount and opposite in retardation direction, and the inner side of the first compensation film is one side of the first compensation film, which faces the liquid crystal layer.

For example, the first substrate is an opposed substrate, and the second substrate is an array substrate.

For example, the first substrate is an array substrate, and the second substrate is an opposed substrate.

For example, the first substrate is provided to have no compensation film.

For example, the second substrate is provided to have no alignment film.

For example, a polarization direction of the first polarizer and a polarization direction of the second polarizer are in parallel with each other or perpendicular to each other.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments of the disclosure, those skilled in the art can obtain all other embodiment(s), without any inventive work, which should be within the scope of the disclosure.

Figure 1:
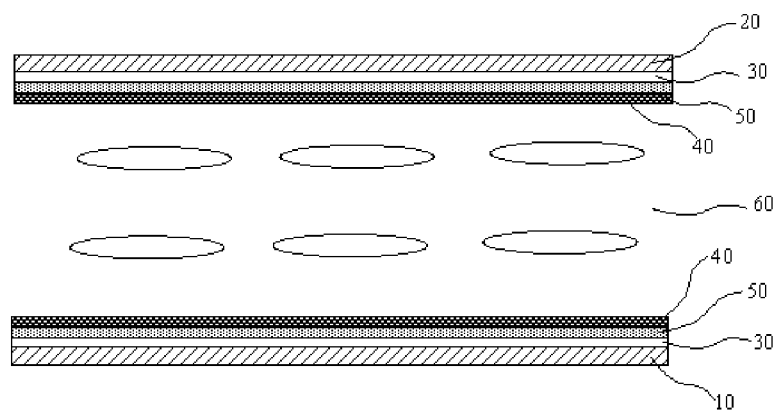
FIG. 1 is a schematic view illustrating a liquid crystal display panel according to one technique.

FIG. 1 is a schematic view illustrating a liquid crystal display panel according to one technique. A shown in FIG. 1, polarizers are arranged inside the liquid crystal display panel. As shown in FIG. 1, the liquid crystal display panel includes a color filter substrate 10 and an array substrate 20 which are oppositely arranged and a liquid crystal layer 60 arranged between the color filter substrate 10 and the array substrate 20, a polarizer 30 and an alignment film 40 are arranged on an inner side of the color filter substrate 10, and a polarizer 30 and an alignment film 40 are arranged on an inner side of the array substrate 20. The liquid crystal of the liquid crystal layer 60 is an optically anisotropic substance and the polarizer has different extinction ratios at different polar angles, and thus, the liquid crystal display panel is easy to generate the light leakage phenomenon at an inclined view angle. In order to solve such a problem, a compensation film needs to be added between the polarizer and the alignment film of the liquid crystal display panel to carry out optical compensation so as to achieve effects of reducing light leakage and enlarge a view angle range. The alignment films 40 in FIG. 1 are used for enabling liquid crystal molecules in the liquid crystal layer 60 to be aligned, and thus, the alignment films 40 need to be in direct contact with the liquid crystal layer 60; and in such case, the compensation films 50 need to be firstly formed and then the alignment films 40 are formed. The compensation films 50 do not resist a high temperature but the alignment films 40 need to be formed by a high-temperature process, so that the high-temperature process for forming the alignment films 40 enables performance of the formed compensation films 50 to be reduced or lose efficacy.

Figure 2:
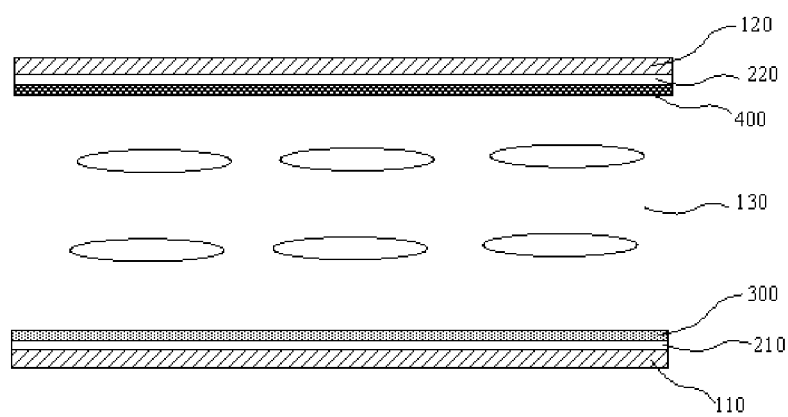
FIG. 2 is a schematic view illustrating a liquid crystal display panel according to embodiments of the present disclosure.
Figure 3:
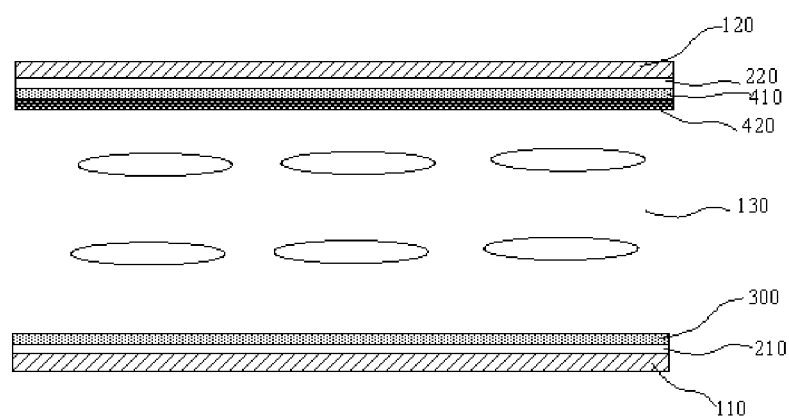
FIG. 3 is another schematic view illustrating the liquid crystal display panel according to the embodiments of the present disclosure.

Embodiments of the present disclosure provide a liquid crystal display panel. As shown in FIG. 2, the liquid crystal display panel includes: a first substrate 110 and a second substrate 120 which are oppositely arranged, and a liquid crystal layer 130 arranged between the first substrate 110 and the second substrate 120; an alignment film 300 arranged on an inner side of the first substrate 110; and a compensation film 400 arranged on an inner side or an outer side of the second substrate 120.

The inner side of the first substrate 110 and the inner side of the second substrate 120 are sides facing each other, and the outer side of the second substrate 120 is a side provided away from the inner side of the second substrate 120. In other words, the inner side of the first substrate 110 is one side of the first substrate 110, which faces the liquid crystal layer 130; the outer side of the first substrate 110 is one side of the first substrate 110, which is provided away from the liquid crystal layer 130; the inner side of the second substrate 120 is one side of the second substrate 120, which faces the liquid crystal layer 130; and the outer side of the second substrate 120 is one side of the second substrate 120, which is provided away from the liquid crystal layer 130.

According to the liquid crystal display panel provided by the embodiments of the present disclosure, the alignment film is arranged on the inner side of the first substrate, and the compensation film is arranged the an inner side or the outer side of the second substrate, i.e., the alignment film is formed on the inner side of the first substrate and the compensation film is not formed on the inner side or the outer side of the first substrate, and the compensation film is formed on the inner side or the outer side of the second substrate and the alignment film is not formed on the inner side of the second substrate. Therefore, the second substrate does not need to form the alignment film and also does not require the high-temperature process for forming the alignment film, so that the compensation effect of the compensation film is guaranteed.

For example, the first substrate is an opposed substrate, and correspondingly, the second substrate is an array substrate; and in such case, the alignment film is only formed on the inner side of the opposed substrate, and correspondingly, the compensation film is formed on the inner side or the outer side of the array substrate. For example, the first substrate is an array substrate, and correspondingly, the second substrate is an opposed substrate; and in such case, the alignment film is only formed on the inner side of the array substrate, and correspondingly, the compensation film is formed on the inner side or the outer side of the opposed substrate. For example, the opposed substrate is a color filter substrate.

For example, as shown in FIG. 2, the compensation film 400 is arranged on the inner side of the second substrate 120; a first polarizer 210 is arranged between the first substrate 110 and the alignment film 300; and a second polarizer 220 is arranged between the second substrate 120 and the compensation film 400. In the case as shown in FIG. 2, the compensation film, the first polarizer and the second polarizer are all built in (that is, they are all provided between the first substrate 110 and the second substrate 210), which enables the liquid crystal display panel to be relatively thin and is suitable for the development tendency of lighting and thinning of the liquid crystal display panel.

For example, the compensation film is a view angle compensation film. The view angle compensation film can reduce light leakage and enlarge the view angle.

For example, in the case that the liquid crystal display panel is a liquid crystal display panel in an ADS or IPS mode, a phase retardation of the compensation film is that $Re=\lambda/2$, where $\lambda$, represents a main wavelength of light of a backlight of the liquid crystal display panel; and refractive indexes nx, ny and nz of the compensation film at an X axis, a Y axis and a Z axis meet the following formula: $(nx-nz)/(nx-ny)=0.5$. The compensation film which meets the above requirements reduces the light leakage and enlarges the view angle better.

The ADS mode is an abbreviated name of an Advanced Super Dimension Switch mode; and in the liquid crystal display panel in the ADS mode, both a pixel electrode and a common electrode are formed on the array substrate, the pixel electrode and the common electrode are arranged on different layers, one of the pixel electrode and the common electrode, which is positioned on the lower layer, is a plate electrode, and one of the pixel electrode and the common electrode, which is positioned on the upper layer, is a slit electrode. The IPS mode is an abbreviated name of an In-Plane-Switching mode; and in the liquid crystal display panel in the IPS mode, both the pixel electrode and the common electrode are arranged on the array substrate and are arranged on the same layer or different layers, and both the pixel electrode and the common electrode are slit electrodes.

For example, in the case that the liquid crystal display panel is a liquid crystal display panel in a VA or TN mode, two layers of compensation films are provided; the compensation film arranged inside the second polarizer is a first compensation film 410, phase retardation of the first compensation film is that $Re=\lambda/2$, where $\lambda$, represents the main wavelength of the light of the backlight of the liquid crystal display panel; the refractive indexes nx, ny and nz of the first compensation film 410 at the X axis, the Y axis and the Z axis meet the following formula: $(nx-nz)/(nx-ny)=0.5$; and the compensation film arranged on the inner side of the first compensation film is a second compensation film, the second compensation film and the liquid crystal layer are equal in absolute value of retardation amount and opposite in retardation direction. The compensation films which meet the above requirement reduce light leakage and enlarge the view angle better. The inner side of the second polarizer is one side of the second polarizer, which faces the liquid crystal layer, and the inner side of the first compensation film is one side of the first compensation film, which faces the liquid crystal layer.

The VA mode is an abbreviated name of a Vertical Alignment mode, and the TN mode is an abbreviated name of a Twisted Nematic mode; and in the liquid crystal display panel in the VA mode and the liquid crystal display panel in the TN mode, the common electrode is arranged on the opposed substrate, and the pixel electrode is arranged on the array substrate.

The X axis, the Y axis and the Z axis of the compensation film respectively are coordinate axes along the length, width and thickness directions of the compensation film.

For example, a polarization direction of the first polarizer 210 and a polarization direction of the second polarizer 220 are in parallel with each other or perpendicular to each other.

For example, the first polarizer and the second polarizer are formed by organic materials. Further, the first polarizer and the second polarizer are made in a manner of stretching the organic materials.

The foregoing embodiment merely is an exemplary embodiment of the disclosure, and not intended to define the scope of the disclosure, and the scope of the disclosure is determined by the appended claims.

The present application claims priority of the Chinese Patent Application No. 201510716010.X filed on Oct. 28, 2015, the disclosure of which are incorporated herein by its reference in its entirety as part of the present application.

The invention claimed is:

1. A liquid crystal display panel, comprising:
a color filter substrate and an array substrate provided with a pixel electrode, wherein the array substrate provided with the pixel electrode and the color filter substrate are oppositely arranged, and a liquid crystal layer is arranged between the array substrate provided the pixel electrode and the color filter substrate;
only one alignment film, arranged on an inner side of the color filter substrate; and
only one compensation film, arranged on an inner side or an outer side of the array substrate provided with the pixel electrode,
wherein the inner side of the color filter substrate and the inner side of the array substrate provided with the pixel electrode are sides facing each other, the outer side of the array substrate provided with the pixel electrode is a side provided away from the inner side of the array substrate provided with the pixel electrode, and the array substrate provided with the pixel electrode and arranged with the only one compensation film is provided with no alignment film, and the color filter substrate provided with the only one alignment film is provided with no compensation film.

2. The liquid crystal display panel according to claim 1, wherein
a first polarizer is arranged between the color filter substrate and the only one alignment film; and
the only one compensation film is arranged on the inner side of the array substrate provided with the pixel electrode, a second polarizer is arranged between the compensation film and the array substrate provided with the pixel electrode.

3. The liquid crystal display panel according to claim 2, wherein a polarization direction of the first polarizer and a polarization direction of the second polarizer are in parallel with each other or perpendicular to each other.

4. The liquid crystal display panel according to claim 2, wherein said only one compensation fill has a first side that is in direct contact with said polarizer, and a second opposite side that is directly adjacent to said liquid crystal layer.

5. The liquid crystal display panel according to claim 2, wherein the only one compensation film is a view angle compensation film for reducing light leakage and enlarging a view angle.

6. The liquid crystal display panel according to claim 5, wherein
the liquid crystal display panel is a liquid crystal display panel in an advanced super dimension switch mode or and in-plane-switching mode,
a phase retardation of the only one compensation film is that Re=$\lambda$/2, where $\lambda$ represents a main wavelength of light of a backlight of the liquid crystal display panel; and
refractive indexes nx, ny and nz of the only one compensation film at an X axis, a Y axis and a Z axis meet the following formula: (nx−nz)/(nx−ny)=0.5.

7. A liquid crystal display panel, comprising:
a color filter substrate and an array substrate provided with a pixel electrode, wherein the array substrate provided with the pixel electrode and the color filter substrate are oppositely arranged, and a liquid crystal layer is arranged between the color filter substrate and the array substrate provided with pixel electrode;
only one alignment film arranged on an inner side of the color filter substrate;
a compensation film arranged on an inner side of the array substrate provided with the pixel electrode; and
a polarizer is arranged between the compensation film and the array substrate provided with the pixel electrode, wherein
the inner side of the color filter substrate and the inner side of the array substrate provided with the pixel electrode are sides facing each other,
the liquid crystal display panel is a liquid crystal display panel in a vertical alignment mode or a twisted nematic mode,
the compensation film comprises a first compensation film and a second compensation film,
the first compensation film is arranged on an inner side of the polarizer, a phase retardation of the first compensation film is that Re=$\lambda$/2, where $\lambda$ represents a main wavelength of a light of a backlight of the liquid crystal display panel, and the inner side of the polarizer is a side of the polarizer, which faces the liquid crystal layer,
refractive indexes nx, ny and nz of the first compensation film at the X axis, the Y axis and the Z axis meet the following formula: (nx−nz)/(nx−ny)=0.5, and
the second compensation film is arranged on an inner side of the first compensation film, the second compensation film and the liquid crystal layer are equal in absolute value of retardation amount and opposite in retardation direction, and the inner side of the first compensation film is a side of the first compensation film, which faces the liquid crystal layer.

* * * * *